United States Patent [19]

Iizuka

[11] Patent Number: 5,220,450
[45] Date of Patent: Jun. 15, 1993

[54] SCANNING OPTICAL SYSTEM CAPABLE OF AUTOMATIC FOCUSING

[75] Inventor: Takashi Iizuka, Tokyo, Japan

[73] Assignee: Asahi Kogaku Kogyo K.K., Tokyo, Japan

[21] Appl. No.: 904,143

[22] Filed: Jun. 25, 1992

[30] Foreign Application Priority Data

Jun. 26, 1991 [JP] Japan .................................. 3-252686
Apr. 21, 1992 [JP] Japan .................................. 4-101384

[51] Int. Cl.⁵ ............................................ G02B 26/08
[52] U.S. Cl. .................................... 359/205; 359/204; 359/216; 250/235; 346/108
[58] Field of Search ............... 359/204, 205, 206, 216, 359/217, 218, 219; 250/235, 236, 234; 346/108

[56] References Cited

U.S. PATENT DOCUMENTS

| | | | |
|---|---|---|---|
| 4,163,600 | 8/1979 | Russell | 359/216 |
| 4,321,700 | 3/1982 | Russell | 359/216 |
| 4,620,089 | 10/1986 | Schlichting et al. | 250/234 |
| 4,733,064 | 3/1988 | Ishikawa | 359/218 |
| 4,912,487 | 3/1990 | Porter et al. | 346/108 |
| 5,036,347 | 7/1991 | Tsunekawa et al. | 354/400 |
| 5,103,091 | 4/1992 | Hirose et al. | 346/108 |
| 5,122,658 | 6/1992 | Ando | 250/235 |

FOREIGN PATENT DOCUMENTS 2304515 12/1990 Japan .
2129931 5/1984 United Kingdom .

Primary Examiner—Loha Ben
Attorney, Agent, or Firm—Sughrue, Mion, Zinn, Macpeak & Seas

[57] ABSTRACT

A scanning optical system capable of automatic focusing includes a gas laser 10 for emitting writing beam, a polygonal mirror 20 for deflecting and reflecting the rays of light from the gas laser 10, a scanning lens 40 that is telecentric with respect to an image plane 30 and which focuses the deflected rays of light to form an image on the image plane, a focus detector 50 that receives the reflected light from the image plane 30 to detect the state of focusing on the plane by the scanning lens 40, and a focus adjusting unit 60 that brings the scanning lens 40 into focus on the image plane 30 on the basis of the output of the focus detector 50. This optical system can be properly corrected for the image plane in such a way that it will not be out of the depth of focus on account of its waviness, tilting and other phenomena even if the F number of the system is reduced.

16 Claims, 3 Drawing Sheets

SCANNING OPTICAL SYSTEM CAPABLE OF AUTOMATIC FOCUSING

BACKGROUND OF THE INVENTION

This application is based on and claims priority from Japanese Application Nos. HEI. 3-252686 filed Jun. 26, 1991 and HEI. 4-101384 filed Apr. 21, 1992, the disclosure of which is incorporated by reference herein.

The present invention relates to a scanning optical system such as a laser plotter that draws an image by scanning with laser light. More particularly, the present invention relates to a scanning optical system that is capable of automatic focusing on the image plane.

The conventional laser plotters are intended to draw images of comparatively low precision and the spot diameter which determine the feature size (minimum line width) has been about 30 $\mu$m. In order to draw images of higher precision and smaller feature size, the spot on the image plane must be further reduced. Since the spot diameter is proportional to the F number of the optical system, it can be reduced by diminishing the latter.

However, the depth of focus of the optical system is proportional to the square of its F number, so if the latter is reduced with a view to improving the precision of patterning or image, it is highly likely that the image plane is out of the depth of focus on account of various factors such as the waviness and tilting of the plane.

SUMMARY OF THE INVENTION

The present invention has been accomplished under these circumstances and has as an object providing a scanning optical system capable of automatic focusing that can be properly corrected for the image plane in such a way that it will not be out of the depth of focus on account of its waviness, tilting and other phenomena even if the F number of the system is reduced.

This and other objects of the present invention can be attained by a scanning optical system that comprises a writing beam source that issues rays of writing light, a deflector that deflects and scans the rays of light from the writing beam source, a scanning lens with which the rays of light deflected by the deflector are focused to form an image on an image plane, a focus detecting means that receives reflected light from the image plane via the scanning lens to detect the state of focusing on the writing plane by the scanning lens, and a focus adjusting means that permits the scanning lens to be properly focused on the image plane on the basis of the output of the focus detecting means.

DESCRIPTION OF THE PREFERRED EMBODIMENTS

The present invention is described below with reference to the accompanying drawings.

EXAMPLE 1

Figure 1:
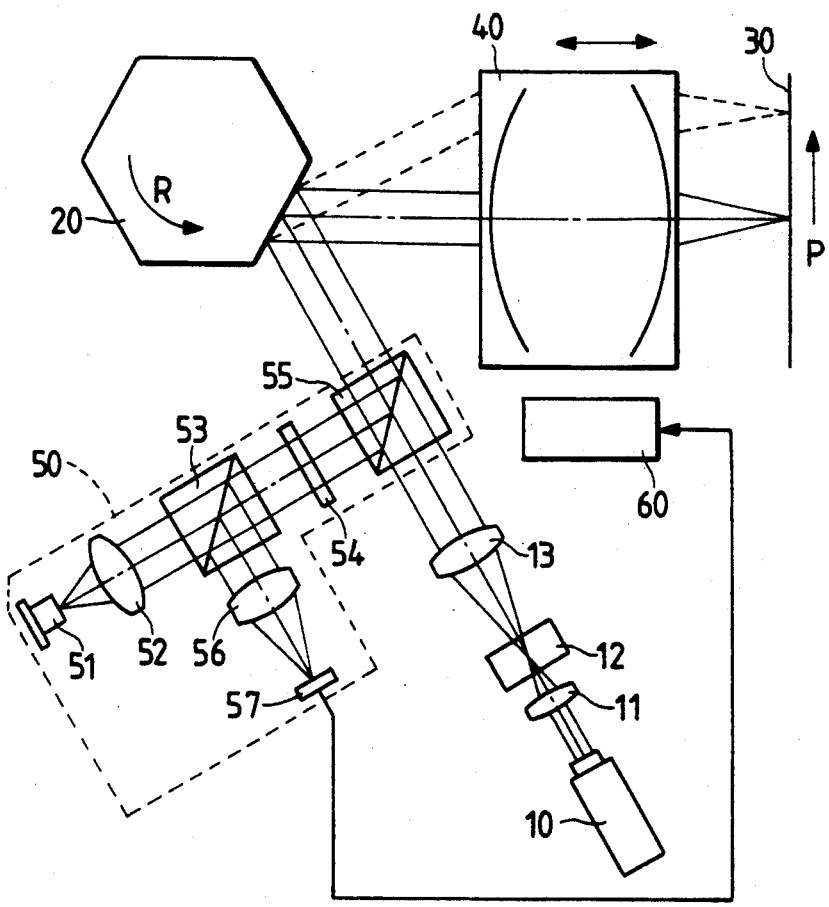
FIG. 1 is a diagram illustrating the scanning optical system of Example 1 of the present invention.

FIG. 1 shows Example 1 of the scanning optical system of the present invention. A gas laser 10 which is a writing beam source emits rays of writing light, which are converged by a conveying lens 11, modulated by an A/O modulator 12 and made parallel by a collimator lens 13. The collimated writing beam is reflected and deflected by a polygonal mirror 20 and focused to form an image on a image plane 30 by means of a telecentric scanning lens 40.

The polygonal mirror 20 rotates in the direction of arrow R as viewed in FIG. 1 whereas a beam spot on the image plane 30 is scanned in the main scanning direction P.

A focus detecting means 50 emits rays of light at a different wavelength than the writing beam source and the emitted rays are superposed on the rays of writing light for scanning over the image plane 30. The reflected light from the image plane is received by the means 50 which detects the state of focusing on the image plane 30 by the scanning lens 40.

A semiconductor laser 51 as a focus detecting light source emits linearly polarized divergent rays of light, which are made parallel by a collimator lens 52, pass through a polarized beam splitter 53 and are transformed to circular polarization by a quarter-wavelength plate 54. A dichroic mirror 55 has such characteristics that it transmit the wavelength of the writing beam while it reflects the wavelength of the focus detecting light beam and the two beams are superposed before falling on the polygonal mirror 20.

The focus detecting light beam which has been reflected and deflected by the polygonal mirror 20 together with the writing beam is focused by the scanning lens 40 to form an image on the image plane 30, thence reflected to have the circular polarization rotated in a direction opposite to the case where the beam was incident on the image plane.

Since the scanning lens 40 is telecentric on the image plane side, the rays of light incident on the image plane 30 are normal thereto. Hence, the focus detecting light beam reflected from the patterning plane 30 returns toward the light source by traveling back in the same optical path as in the case where it was incident on the image plane. The returning beam is reflected by the dichroic mirror 55.

The light beam reflected by the dichroic mirror 55 passes through the quarter-wavelength plate 54 to be transformed to linear polarization in a direction perpendicular to the case where the light issued from the semiconductor laser 51. The linearly polarized beam is reflected by the polarized beam splitter 53 and passes through an anamorphic condenser lens 56 to be condensed on a light-receiving element 57.

The principle of focus detection to be performed in the present invention is the same adopted by an optical disk system for detecting focusing errors. Stated more specifically, the focus detection is performed on the basis of the fact that the shape and size of a beam shot on the light-receiving element are changed in response to the imaging condition on the image plane of the writing beam, i.e., the focus condition of the scanning condition.

A focus signal as detected by the light-receiving element 57 is fed to a focus adjusting means 60. In the case under consideration, the focus adjusting means 60 adjusts focus by driving the scanning lens 40 along the optical axis. The scanning lens 40 may be driven in its entirety; however, if it is composed of more than one group of lenses, part of it may be driven by the adjusting means 60.

According to the system of Example 1, the wavelength of the focus detecting light is set to be outside the spectral (or exposure) sensitivity range of the image plane, so the state of focusing on that plane can be detected without affecting the quality of patterned image. As a further advantage, focus detection is possible even if the writing beam source is not activated to emit light.

EXAMPLE 2

Figure 2:
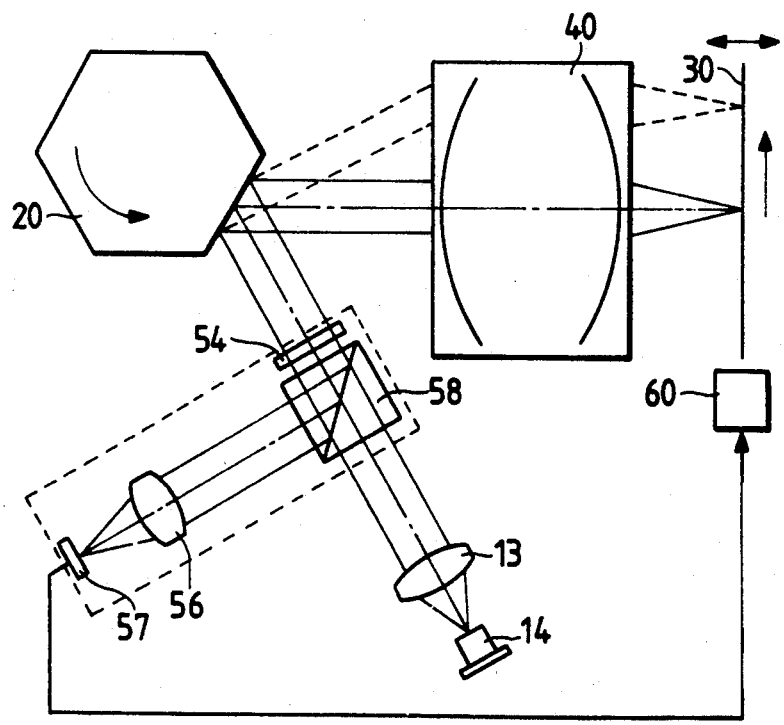
FIG. 2 is a diagram illustrating the scanning optical system of Example 2 of the present invention.

FIG. 2 shows Example 2 of the scanning optical system of the present invention. The system of Example 2 uses a directly tunable semiconductor laser 14 as a writing beam source and the reflected writing beam writing beam is used in focus detection.

The writing beam issuing from the semiconductor laser 14 is transmitted through a collimator lens 13, a polarized beam splitter 58 and a quarter-wavelength plate 54 to be transformed to a circularly polarized parallel beam, which is then reflected and deflected by a polygonal mirror 20. The deflected beam passes through a scanning lens 40 to be focused on an image plane 30.

The light beam reflected from the patterning plane 30 travels backward in the same optical path as in the case where it was incident on the patterning plane and it is then launched into the quarter-wavelength plate 54 so that it is transformed to linear polarization in a direction perpendicular to the case of incidence on the image plane. The linearly polarized beam is reflected by the polarized beam splitter 58 and passes through a condenser lens 56 to be condensed on a light-receiving element 57.

A signal from the light-receiving element 57 is fed to a focus adjusting means 60. In the case under consideration, the focus adjusting means 60 drive the image plane 30 along the optical axis, thereby adjusting the state of focusing on the patterning plane 30 by the scanning lens 40.

The system of Example 2 has the advantage that it is capable of detecting the state of focusing with a simple configuration without using a separate light source from the writing beam source.

EXAMPLE 3

Figure 3:
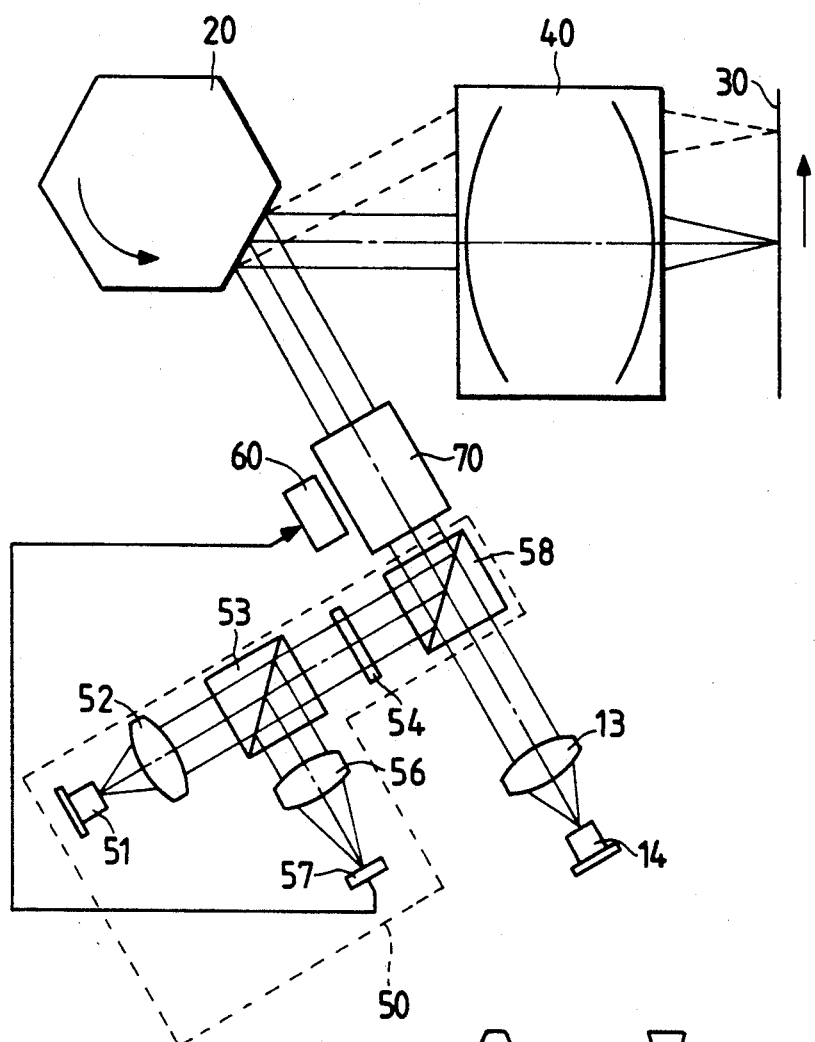
FIG. 3 is a diagram illustrating the scanning optical system of Example 3 of the present invention.
Figure 4A:
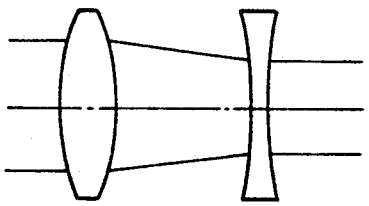
FIGS. 4A-4C are diagrams illustrating specific embodiments of the adjusting section in the system of Example 3.
Figure 4B:
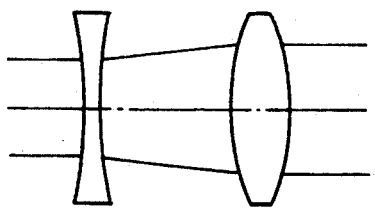
Figure 4C:
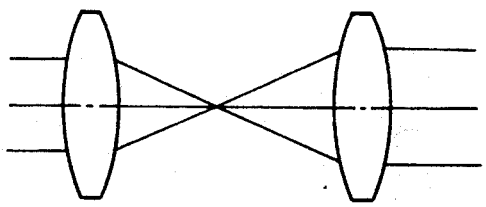

FIGS. 3 and 4 show Example 3 of the scanning optical system of the present invention. The system of Example 3 uses semiconductor lasers 14 and 51, one being used as a writing beam source and the other as a focus detecting light source; the system provides a polarized beam splitter 58 to have the light from the semiconductor laser 14 superposed on the light from the other semiconductor laser 51.

The rays of patterning light issued from the semiconductor laser 14 are transmitted through a collimator lens 13 and a polarized beam splitter 58, adjusted for parallelness by an adjusting section 70, and reflected and deflected by a polygonal mirror 20. The deflected beam passes through a scanning lens 40 to be focused on a image plane 30.

The rays of focus detecting light issued from other semiconductor laser 51 are transmitted through a collimator lens 52 and a first polarized beam splitter 53 and transformed to circular polarization by a quarter-wavelength plate 54. Part of the circularly polarized beam of focus detecting light is reflected by a second polarized beam splitter 58 and superposed on the beam of patterning light.

The focus detecting light beam reflected from the image plane 30 returns toward the light sources by travelling back in the same optical path as in the case where it was incident on the image plane and part of that beam is further reflected by the second polarized beam splitter 58. The patterning light beam incident on the image plane 30 remains linearly polarized, so even if it is reflected from the image plane, it just passes through the second polarized beam splitter without being launched into the focus detecting means 50. The focus detecting light beam reflected by the second polarized beam splitter 58 passes through the quarter-wavelength plate 54 to be transformed to linear polarization in a direction perpendicular to the case where the beam was incident on the image plane 30. The linearly polarized light beam is reflected by the first polarized beam splitter 53 and passes through the condenser lens 56 to be condensed on a light-receiving element 57.

The adjusting section 70 is composed of a beam expander of various types as shown in FIG. 4. The left side of FIG. 4 is close to the light sources and the right side to the polygonal mirror. FIG. 4A shows a Galilean beam expander comprising a positive and a negative lens arranged in that order; FIG. 4B shows an inverted Galilean beam expander comprising a negative and a positive lens arranged in that order; and FIG. 40 shows a Keplerian beam expander comprising two positive lens elements. Whichever type of beam expander is used, the parallelness of a light beam can be adjusted by moving one of two lens elements along the optical axis. Also, in Example 3, the focus adjustment of the scanning lens is effected by the focus adjusting means 60 in which the adjusting section 70 is moved in response to the output of the light-receiving element 57.

The system of Example 3 has the advantage that it is capable of focus detection even if the image light source is not activated to emit light. It should, however, be noted that if two light beams of substantially the same wavelength are to be used for patterning and focus detecting purposes, care must be taken to sufficiently suppress the energy of the incident focus detecting light beam so that it will not adversely affect the quality of patterned image.

EXAMPLE 4

Figure 5:
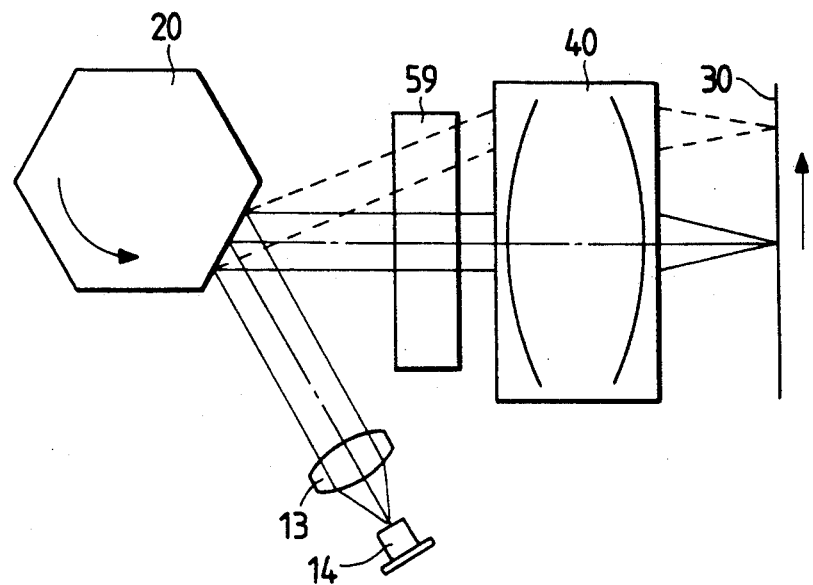
FIGS. 5 and 6 show Example 4 of the invention.
Figure 6:
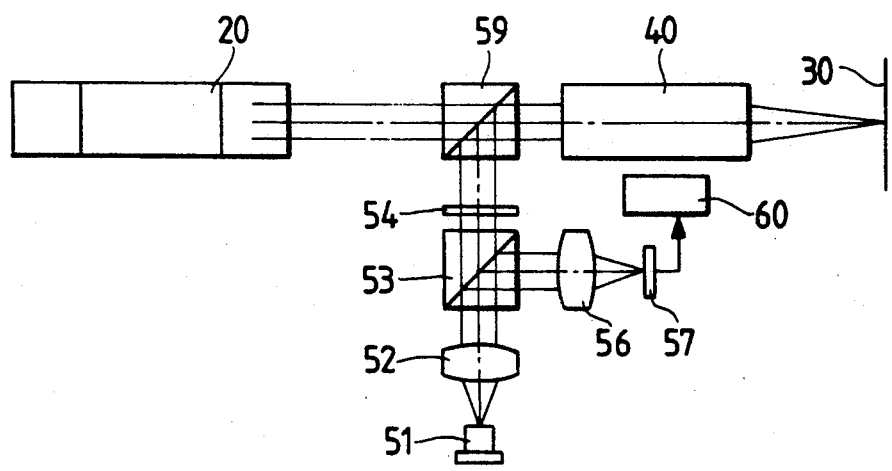

FIGS. 5 and 6 show Example 4 of the scanning optical system of the invention. In this example, between a polygonal mirror 20 and a scanning lens 40, there is provided a polarizing beam splitter 59 for covering a range of light flux deflected by the polygonal mirror 20. The light beam emitted from the semiconductor laser 51 for detecting the focusing state is introduced through a collimator lens 52, a polarizing beam splitter 53 and a quarter-wavelength plate 54 to the polarizing beam splitter 59. A part of the beam is reflected to be focused on a light receiving element 57 through a condenser lens 56.

An incidental angle of the patterning beam is changed relative to the polarizing beam splitter 59 and the scanning lens 40 as the polygonal mirror rotates, while scanning on the patterning plane 30. In contrast thereto, the monitoring beam is incidental to the scanning lens 40 always at a constant angle and is converged in a central portion of the main scanning range of the image plane. Thus, it is possible to detect the focusing state of the scanning lens 40 relative to the central portion of the main scanning range of the image plane.

A focus adjusting means 60 causes the scanning lens 40 to move in the optical axial direction in accordance with a focusing state to thereby adjust the focus in conformity with the image plane.

In the four embodiments described above, different focus detecting means are combined with different focus adjusting means. It should, however, be noted that the combinations of those means are in no way fixed and that any types of focus detecting means can be combined with any types of focus adjusting means. It is also possible to use the non-telecentric lens as a scanning lens although the telecentric lens is used on the image side in the embodiments. Also, the scanning lens may be composed of a single lens element or a plurality of lens elements which may include a plastic lens.

As described on the foregoing pages, the scanning optical system of the present invention applies feedback on the basis of detection of the state of focusing on the patterning plane by a beam spot that is scanned over the patterning plane. Since this insures focused images to be drawn at all times, the spot can be prevented from coming out of the depth of focus due to the waviness, tilting or other phenomena of the patterning plane even if the depth of focus of the optical system is shallow.

What is claimed is:

1. A scanning optical system capable of automatic focusing that comprises:
   a writing beam source that issues writing beam;
   a deflector that deflects and scans the rays of light from said writing beam source;
   a scanning lens with which the rays of light deflected by said deflector are focused to form an image on an image plane;
   a focus detecting means that receives the reflected light from said image plane via said scanning lens to detect the state of focusing on said image plane by said scanning lens; and
   a focus adjusting means that permits said scanning lens to properly focus the reflected light on said image plane on the basis of the output of said focus detecting means.

2. The scanning optical system according to claim 1, wherein said scanning lens comprises a telecentric scanning lens.

3. The scanning optical system according to claim 2, wherein said scanning lens includes a plastic lens element.

4. The scanning optical system according to claim 2, wherein said focus detecting means uses the rays of light that are issued from said image light source and that are reflected by the image plane.

5. The scanning optical system according to claim 2, wherein said focus detecting means uses the rays of light that are issued from a focus detecting light source different from said writing beam source and that are reflected by the image plane.

6. The scanning optical system according to claim 2, wherein said focus adjusting means allows at least part of the scanning lens to be moved along the optical axis.

7. The scanning optical system according to claim 2, wherein said focus adjusting means moves the image plane along the optical axis.

8. The scanning optical system according to claim 2, wherein said focus adjusting means is provided between said writing beam source and said deflector to adjust the parallelness of the rays of light from said light source.

9. The scanning optical system according to claim 1, wherein said scanning lens includes a plastic lens element.

10. The scanning optical system according to claim 1, wherein said focus detecting means uses the rays of light that are issued from said writing beam source and that are reflected by the image plane.

11. The scanning optical system according to claim 1, wherein said focus detecting means uses the rays of light that are issued from a focus detecting light source different from said writing beam source and that are reflected by the image plane.

12. A scanning optical system according to claim 11, wherein said focus detecting light source emits light at a different wavelength than said writing beam source.

13. A scanning optical system according to claim 12, wherein said focus detecting light source emits light at a wavelength outside the spectral sensitivity range of the image plane.

14. The scanning optical system according to claim 1, wherein said focus adjusting means allows at least part of the scanning lens to be moved along the optical axis.

15. The scanning optical system according to claim 1, wherein said focus adjusting means moves the image plane along the optical axis.

16. The scanning optical system according to claim 1, wherein said focus adjusting means is provided between said writing beam source and said deflector to adjust the parallelness of the rays of light from said light source.

* * * * *